(12) United States Patent
Ikemoto et al.

(10) Patent No.: US 9,565,346 B2
(45) Date of Patent: Feb. 7, 2017

(54) CAMERA MODULE

(71) Applicant: Murata Manufacturing Co., Ltd., Nagaokakyo-shi, Kyoto-fu (JP)

(72) Inventors: Nobuo Ikemoto, Nagaokakyo (JP); Shigeru Tago, Nagaokakyo (JP); Yuki Ito, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 58 days.

(21) Appl. No.: 14/546,048

(22) Filed: Nov. 18, 2014

(65) Prior Publication Data
US 2015/0070577 A1    Mar. 12, 2015

Related U.S. Application Data

(63) Continuation of application No. PCT/JP2014/056838, filed on Mar. 14, 2014.

(30) Foreign Application Priority Data

Mar. 27, 2013  (JP) .................................. 2013-065929

(51) Int. Cl.
*H04N 5/225* (2006.01)
*H04N 5/335* (2011.01)
(Continued)

(52) U.S. Cl.
CPC ............ *H04N 5/2253* (2013.01); *G03B 17/02* (2013.01); *H04N 5/2257* (2013.01)

(58) Field of Classification Search
CPC ............ H01L 2224/48247; H01L 2224/32145; H01L 2224/4826; H01L 27/14685; H01L 23/4951; H01L 24/48; H01L 27/14636; H01L 2924/14; H01L 2924/18165; H01L 31/18; H01L 27/14625; H01L 21/768; H04N 5/2257
(Continued)

(56) References Cited

U.S. PATENT DOCUMENTS 8,711,277 B2 *  4/2014  Apel ................. H01L 27/14618
                                                      348/360
8,982,257 B2 *  3/2015  Chen ...................... H04N 5/335
                                                      257/684
(Continued)

FOREIGN PATENT DOCUMENTS

JP   2001-128072 A    5/2001
JP   2001-281145 A   10/2001
(Continued)

OTHER PUBLICATIONS

Official Communication issued in International Patent Application No. PCT/JP2014/056838, mailed on Apr. 8, 2014.

*Primary Examiner* — Trung Diep
(74) *Attorney, Agent, or Firm* — Keating & Bennett, LLP

(57) ABSTRACT

A camera module includes an imaging function section, a connector forming section, and a connecting section combined in a laminated body. The connecting section is thinner than the imaging function section and is bendable. The imaging function section includes a cavity and a through hole. An image sensor IC is disposed within the cavity. A lens unit is mounted in the imaging function section to be optically coupled to the image sensor IC via the through hole. A light shielding member covers a boundary between the connecting section and the imaging function section that define a height difference.

20 Claims, 14 Drawing Sheets

(51) Int. Cl.
*H01L 31/0203* (2014.01)
*G03B 17/02* (2006.01)
(58) Field of Classification Search
USPC .. 348/34, 342, 360, 373–375; 257/431–435; 359/819–830
See application file for complete search history.

(56) References Cited

U.S. PATENT DOCUMENTS

2004/0189862 A1* 9/2004 Gustavsson ........ G02B 13/0015
348/376
2009/0128684 A1* 5/2009 Apel ................. H01L 27/14618
348/360

FOREIGN PATENT DOCUMENTS

| | | |
|---|---|---|
| JP | 2002-051268 A | 2/2002 |
| JP | 2002-077678 A | 3/2002 |
| JP | 2009-295821 A | 12/2009 |

\* cited by examiner

CAMERA MODULE

BACKGROUND OF THE INVENTION

1. Field of the Invention

The present invention relates to a camera module including an imaging function section, and a cable section and a connector section that couple the imaging function section to an external circuit.

2. Description of the Related Art

At present, most portable devices, such as mobile phones and PDAs, have a photographing function. A camera module that realizes such a photographing function typically has a structure described in Japanese Unexamined Patent Application Publication No. 2001-128072.

A camera module described in Japanese Unexamined Patent Application Publication No. 2001-128072 is structured such that an imaging function section including a lens unit and an image sensor IC is provided on a substrate that couples the imaging function section to an external circuit. Specifically, the substrate has an aperture. The lens unit is disposed on one principal surface side of the aperture, and the image sensor IC is provided on the other principal surface side of the aperture. A light shielding film is provided on the other principal surface of the substrate, on which the image sensor IC is mounted, to cover the image sensor IC.

However, the imaging function section of the camera module in Japanese Unexamined Patent Application Publication No. 2001-128072 has high strength because it has a structure in which multiple electronic components are mounted on both surfaces thereof. On the other hand, the imaging function section is coupled to the external circuit by the substrate, and a part having a function of coupling to the external circuit (an external wiring part) is formed only by the substrate. Hence, the strength of this part is lower than that of the imaging function section.

Therefore, when bending stress is imposed on the substrate, great stress is applied to a boundary position between the external wiring part and the imaging function section in the substrate. For this reason, the substrate may break from the boundary position. If such breakage occurs, outside light enters the imaging function section via a broken surface, and unnecessary light that does not pass through the lens unit is received by the image sensor IC.

Further, when a flexible substrate, such as a resin multilayer board, is adopted as the above-described external wiring part, the imaging function section and the external wiring part are combined by the flexible substrate while thickening the imaging function section and thinning the external wiring part.

In this case, if the external wiring part is curved by external force applied thereto, stress concentrates at the boundary between the imaging function section and the external wiring part, that is, at the boundary between portions having different thicknesses, and breakage is more apt to occur. If breakage occurs, outside light enters the imaging function section via a broken surface, and unnecessary light is received by the image sensor IC.

When a flexible substrate is used, a flexible substrate in which an imaging function section and an external wiring part are combined is formed by bonding a plurality of flexible material sheets (resin sheets) by heat and pressure. However, since the imaging function section and the external wiring part are different in thickness, bonding is sometimes not sufficient at the boundary position. Hence, the degree of adhesion between the material sheets, that is, between dielectric layers may decrease. If the degree of adhesion between the dielectric layers is low in this way, unnecessary light may pass through interfaces between the dielectric layers, and the unnecessary light may be received by the image sensor IC.

SUMMARY OF THE INVENTION

Accordingly, preferred embodiments of the present invention provide a camera module in which unnecessary light to be received by an image sensor IC without passing through a lens unit does not enter an imaging function section.

According to a preferred embodiment of the present invention, a camera module includes a laminated body including a plurality of stacked flexible material layers, an image sensor IC including a light receiving element, and a lens unit configured to collect light on the light receiving element. The laminated body is structured such that an imaging function section is combined with a connecting section coupled to the imaging function section and having a thickness less than a thickness of the imaging function section. The imaging function section includes a cavity that receives the image sensor IC in the imaging function section, and a through hole that allows the cavity to communicate with the outside. The image sensor IC is disposed within the cavity such that the light receiving element faces the other principal surface. The lens unit is disposed on the other principal surface of the laminated body to be optically coupled to the light receiving element via the through hole. A light shielding member is configured to include a boundary between surfaces of the imaging function section and the connecting section that define a height difference.

In this structure, since the light shielding member is provided, the strength at the boundary between the imaging function section and the connecting section increases, and unnecessary light, such as outside light, does not enter the imaging function section from the boundary.

The light shielding member is preferably provided on the entire surface of the connecting section that defines the height difference with the imaging function section.

In this structure, the light shielding member also defines and functions as an insulating resist film for the connecting section.

The light shielding member is preferably provided to further cover the side surface of the imaging function section on a side of the connecting section.

In this structure, unnecessary light does not enter the imaging function section from the surface of the imaging function section on the side of the connecting section.

The height difference preferably is located on the other principal surface side of the imaging function section. In a thickness direction of the laminated body, a surface of the cavity on a side of the through hole is provided at the same position as the surface of the connecting section including the height difference, or in an area where the imaging function section is not in contact with the connecting section.

In this structure, if unnecessary light enters from the boundary between the imaging function section and the connecting section, it is directly incident on the cavity via interfaces between the flexible material layers that constitute the laminated body. However, because of the existence of the light shielding member, such incidence of unnecessary light is prevented reliably.

The cavity preferably is configured to open to the outside on a side opposite from the through hole, a cover member preferably is provided to cover the cavity, and the light shielding member preferably is provided to cover a boundary where an end surface of the cover member is in contact with the laminated body.

In this structure, an open surface of the cavity is covered with the cover member, and the portion from the end surface of the cover member to the other principal surface of the laminated body is covered with the light shielding member. Hence, incidence of unnecessary light from the open surface of the cavity is prevented reliably.

The cover member preferably is configured to cover the imaging function section, and the light shielding member preferably is configured to extend to an interface between the imaging function section and the cover member.

In this structure, since the imaging function section is covered with the cover member, incidence of unnecessary light is significantly reduced or prevented, and the light shielding member prevents unnecessary light from leaking in via the interface between the imaging function section and the cover member.

According to various preferred embodiments of the present invention, unnecessary light to be received by the image sensor IC without passing through the lens unit is reliably prevented from entering the imaging function section.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5A is a side view of a formed laminated body, FIG. 5B illustrates a state in which various components are mounted on the laminated body, and FIG. 5C illustrates a completed state of the camera module.

DETAILED DESCRIPTION OF THE PREFERRED EMBODIMENTS

Figure 1:
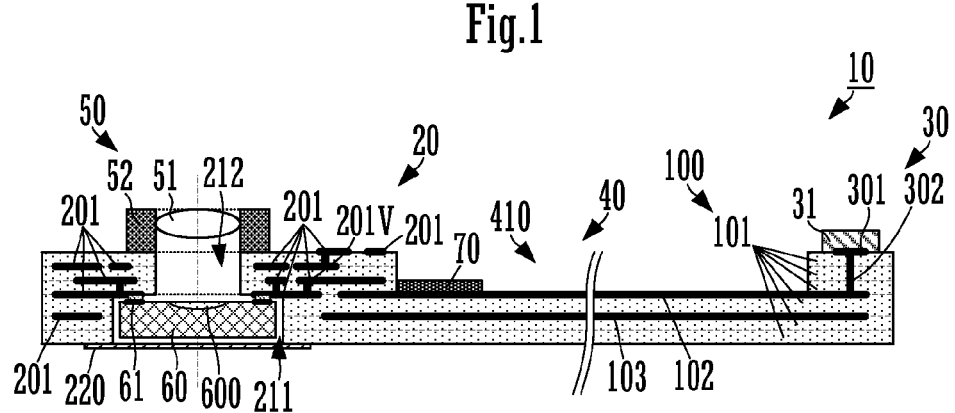
FIG. 1 is a sectional side view of a camera module according to a first preferred embodiment of the present invention.
Figure 2:
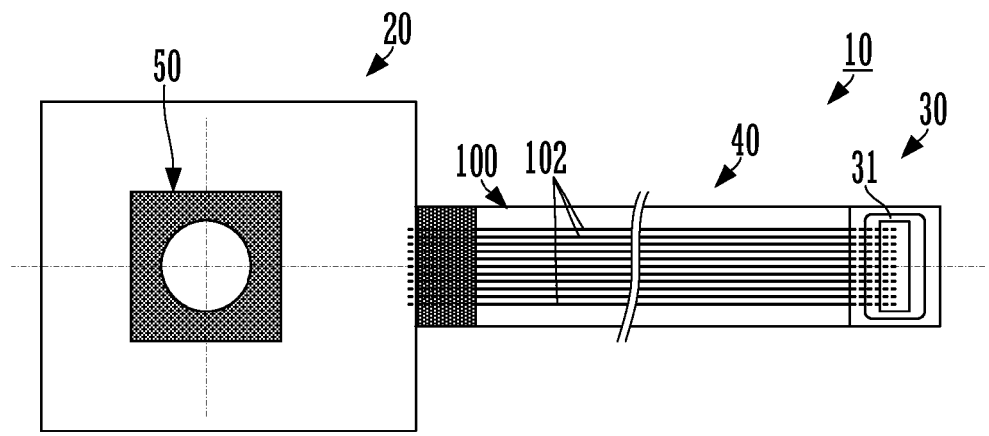
FIG. 2 is a plan view of a lens surface side of the camera module according to the first preferred embodiment of the present invention.
Figure 3:
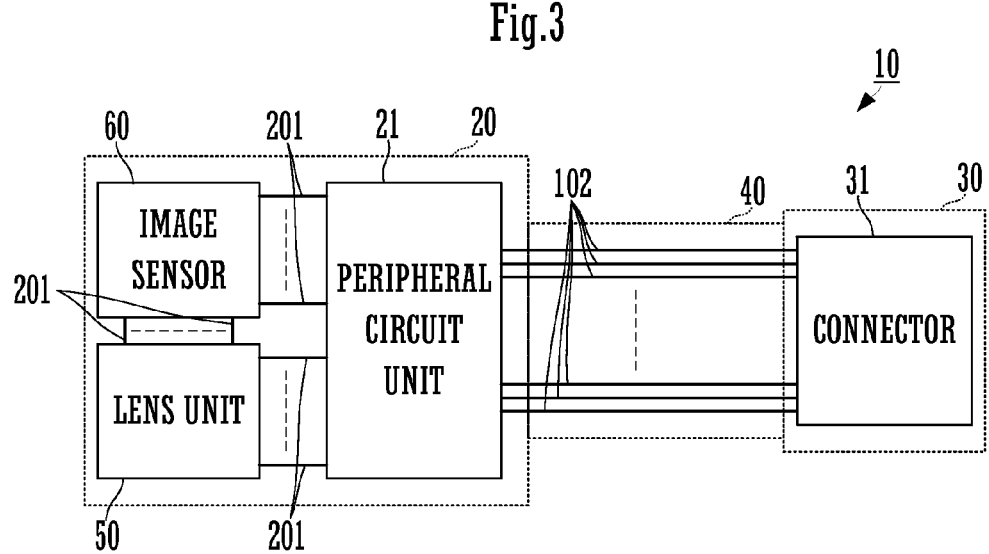
FIG. 3 is a functional block diagram of the camera module according to the first preferred embodiment of the present invention.

A camera module according to a first preferred embodiment of the present invention will be described with reference to the drawings. FIG. 1 is a sectional side view of the camera module according to the first preferred embodiment of the present invention. FIG. 2 is a plan view of a lens surface side of the camera module according to the first preferred embodiment of the present invention. FIG. 3 is a functional block diagram of the camera module according to the first preferred embodiment of the present invention. In FIGS. 1, 2, and 3, all conductor patterns and peripheral circuit components are not illustrated for ease of understanding and illustration.

A camera module 10 includes an imaging function section 20, a connector forming section 30, and a connecting section 40, and includes, in a functional circuit, a lens unit 50, an image sensor IC 60, a peripheral circuit unit 21, and a connector element 31, as illustrated in FIG. 3. The lens unit 50, the image sensor IC 60, and the peripheral circuit unit 21 are provided in the imaging function section 20. In the imaging function section 20, conductor patterns 201 are disposed to couple the lens unit 50, the image sensor IC 60, and the peripheral circuit unit 21. The connector element 31 is provided in the connector forming section 30. The connecting section 40 physically and electrically couples the imaging function section 20 and the connector forming section 30.

The camera module 10 includes a laminated body 100. The laminated body 100 has a structure in which a plurality of flexible material layers 101 are stacked. As the material of the flexible material layers 101, thermoplastic resin is preferably used, and for example, a liquid polymer is used. The use of the liquid polymer is preferable, because the liquid polymer has water resistance higher than those of other flexible materials represented by polyimide and thus significantly reduces or prevents dimensional change.

Each of the flexible material layers 101 is configured to extend in all of the imaging function section 20, the connector forming section 30, and the connecting section 40. Further, the number of stacked flexible material layers 101 in the imaging function section 20 and the number of stacked flexible material layers 101 in the connector forming section 30 preferably are more than the number of stacked flexible material layers 101 in the connecting section 40.

With this structure, the imaging function section 20, the connector forming section 30, and the connecting section 40 preferably are integrally defined by the single laminated body 100. The thickness of the imaging function section 20 and the thickness of the connector forming section 30 preferably are greater than the thickness of the connecting section 40.

By appropriately setting the number of flexible material layers 101 that are common to the imaging function section 20, the connector forming section 30, and the connecting section 40 and independently setting the numbers of flexible material layers 101 to be provided in the imaging function section 20 and the connector forming section 30, strength (rigidity) of the imaging function section 20 and the connector forming section 30, which should not be deformed, is significantly increased so as not to degrade the imaging function and ease of connector mounting while ensuring flexibility of the connecting section 40 such that the connecting section 40 is easily bent or routed. Also, since it is unnecessary to mechanically connect the sections by solder, stress is dispersed at the time of bending, resistance to bending and warpage is increased, and connection reliability of the image sensor IC 60 and the lens unit 50 is ensured.

In the structure of this preferred embodiment, common flexible material layers 101 are disposed at one end of the laminated body 100 in a thickness direction. Thus, one principal surface in the thickness direction is flat from the imaging function section 20 to the connector forming section 30 via the connecting section 40. In contrast, the other principal surface in the thickness direction has a structure such that the imaging function section 20 and the connector forming section 30 protrude from the connecting section 40, in other words, such that only the connecting section 40 has a recess 410 indented in the thickness direction. That is, a height difference is provided between the imaging function section 20 and the connecting section 40, and a height difference is provided between the connecting section 40 and the connector forming section 30.

In the imaging function section 20 of the laminated body 100, the lens unit 50, the image sensor IC 60, and the peripheral circuit unit 21 are mounted or formed. The peripheral circuit unit 21 includes conductor patterns 201 configured to be parallel or substantially parallel to the principal surface (perpendicular or substantially perpendicular to the thickness direction), and conductor patterns 201V configured to be parallel or substantially parallel to the thickness direction (perpendicular to the principal surface). The imaging function section 20 of the laminated body 100 further includes a cavity 211 and a through hole 212.

The cavity 211 is preferably indented or recessed from one principal surface of the imaging function section 20 (a flat surface extending toward the connecting section 40 and the connector forming section 30). The depth of the cavity 211 preferably is greater than the height of the image sensor IC 60. That is, the depth of the cavity 211 is configured such that a top surface of the image sensor IC 60 does not protrude from the cavity 211 when the image sensor IC 60 is mounted and disposed within the cavity 211. It is only necessary that the aperture area of the cavity 211 preferably is greater than the planar area of the image sensor IC 60. The aperture area is preferably as close to the planar area of the image sensor IC 60 as possible because this improves the protection ability and light shielding property of the image sensor IC 60.

The cavity 211 is preferably located near the center or approximate center of the imaging function section 20 in plan view. However, it is only necessary that the cavity 211 is positioned so as not to open in a side surface, that is, so as to be completely surrounded by a wall surface.

Further, a bottom surface of the cavity 211 is preferably provided at the same position as the other principal surface of the connecting section 40 in the thickness direction.

The through hole 212 is configured to penetrate between the bottom surface of the cavity 211 and the other principal surface of the imaging function section 20 in the laminated body 100 (a surface protruding from the connecting section 40). The through hole 212 is configured such that the center of the through hole 212 coincides or substantially coincides with the center of the cavity 211 in plan view. The aperture shape of the through hole 212 preferably has a size not less than a size of a lens 51 of the lens unit 50 disposed on the other principal surface. The through hole 212 defines and functions as an optical path that optically couples the lens 51 and the image sensor IC 60.

The lens unit 50 includes a lens 51 and a lens driving unit 52. The lens driving unit 52 is configured to hold the lens 51 and change the position of the lens 51 in a height direction. The lens unit 50 is disposed on the other principal surface of the imaging function section 20. The lens unit 50 preferably is disposed in the imaging function section 20 such that the aperture center of the through hole 212 coincides with the planar center of the lens 51. The lens driving unit 52 is coupled to the conductor patterns 201 provided in the laminated body 100.

The image sensor IC 60 is disposed within the cavity 211 provided on the one principal surface side of the imaging function section 20. The image sensor IC 60 is disposed such that a light receiving element 600 faces toward the bottom surface of the cavity 211. External connection lands 61 of the image sensor IC 60 are mounted on the conductor pattern 201 provided on the bottom surface of the cavity 211. Thus, the image sensor IC 60 is coupled to the conductor patterns 201 provided in the laminated body 100.

In this structure, since the image sensor IC 60 is stored in the cavity 211, outside light other than light passing through the lens unit 50 and the through hole 212 is significantly restricted or prevented from being applied to a light receiving surface of the image sensor IC 60, which improves imaging performance.

Further, a cover member 220 is disposed on an open surface of the cavity 211. The cover member 220 is preferably made of a material configured like a flat plate and having a light shielding property, and is configured to cover the entire open surface of the cavity 211. By disposing this cover member 220, unnecessary light from the outside considerably restricted or prevented from entering the cavity 211 and being applied to the light receiving surface of the image sensor IC 60.

Further, as the cover member 220, a member having strength higher than that of the flexible material layers 101 is preferably used, and for example, a metal member is used. This improves the shape holding function of the cavity 211 and increases the strength of the imaging function section 20.

The conductor patterns 201 are configured in a predetermined pattern between the flexible material layers 101 or on one end surface or the other end surface of the imaging function section 20 to realize the circuit function of the peripheral circuit unit 21. The conductor patterns 201 are preferably provided in a region of the imaging function section 20 except for the cavity 211 and the through hole 212, that is, in a region where the flexible material layers 101 are provided. The conductor patterns 201V preferably are so-called via conductors, and are configured to extend in a direction to penetrate the flexible material layers 101. Since the conductor patterns 201 and 201V are thus provided in the region where the flexible material layers 101 are provided, the strength of the region where the flexible material layers 101 are provided, that is, the strength of the imaging function section 20 is significantly increased. The formation density of these conductor patterns 201 and 201V in the imaging function section 20 is preferably more than in the connecting section 40.

Although not illustrated, a passive element component, such as a bypass capacitor, may be mounted in the imaging function section 20. When a peripheral circuit component has a strength higher than that of the flexible material layers 101, for example, like a ceramic capacitor, incorporation of the peripheral circuit component increases the strength (rigidity) of the side wall of the cavity 211 and further increases the strength (rigidity) of the imaging function section 20.

According to such a structure, the lens unit 50 is disposed on one end surface of the imaging function section 20, and the image sensor IC 60 is disposed within the cavity 211 on the other end surface side. Hence, the thickness of the imaging function section 20 is preferably minimized or significantly reduced while ensuring the required distance between the lens unit 50 and the image sensor IC 60.

Further, the peripheral circuit unit 21 including the conductor patterns 201 and 201V is disposed in the region of the imaging function section 20 where the flexible material layers 101 are provided, except for the cavity 211, in which the image sensor IC 60 is disposed, and the through hole 212. The peripheral circuit unit 21 is disposed at high density particularly in the side wall portion of the cavity 211. Thus, since the peripheral circuit unit 21 do not align with the lens unit 50 and the image sensor IC 60 in the thickness direction, the imaging function section is capable of being thinned or minimized, and the cavity 211 is resistant to deformation.

In the connecting section 40, signal conductors 102 and a ground conductor 103 preferably are provided. A plurality of signal conductors 102 are elongated. The signal conductors 102 and the ground conductor 103 are disposed to extend parallel or substantially parallel to an extending direction of the connecting section 40, that is, a direction to be coupled to the imaging function section 20 and the connector forming section 30. As illustrated in FIG. 2, the plural signal conductors 102 are preferably arranged at regular intervals in a width direction of the connecting section 40 (a direction perpendicular or substantially perpendicular to the extending direction and the thickness direction).

The signal conductors 102 are coupled at one end in the extending direction to the conductor patterns 201 in the imaging function section 20. The signal conductors 102 are coupled at the other end in the extending direction to a connection via conductor 302 in the connector forming section 30.

The signal conductors 102 are disposed on the other principal surface of the connecting section 40. The ground conductor 103 is disposed at an intermediate position in the thickness direction of the connecting section 40. According to this structure, a microstrip transmission line is defined by the signal conductors 102, the ground conductor 103, and the flexible material layer 101 provided therebetween. With this structure, a highly flexible high-frequency transmission line is realized, and flexibility of the connecting section 40 is ensured. A low-frequency or DC line, such as a power supply line, is also provided. The low-frequency or DC line, such as a power supply line, does not always need to constitute a so-called 50Ω line such as a microstrip transmission line.

In the connector forming section 30, a connector mounting land 301 and a connection via conductor 302 are provided in the laminated body 100. More specifically, the connector mounting land 301 is provided on the other principal surface of the connector forming section 30 (an end surface protruding relative to the connecting section 40), and the connector mounting land 301 and the signal conductors 102 are coupled by the connection via conductor 302 extending in the thickness direction. The connector element 31 is mounted on the connector mounting land 301.

For example, the thickness of the connector forming section 30 may be equal or substantially equal to the thickness of the connecting section 40. However, similarly to the imaging function section 20, the strength of the connector forming section 30 is increased by making the connector forming section 30 thick. This prevents the connector forming section 30 from bending and warping when the connector element 31 is attached to a motherboard. Therefore, the connector element 31 is easily attached, and a boundary portion between the connector forming section 30 and the connecting section 40 is prevented from being broken by the attachment.

According to the above-described structure, it is possible to realize a low-profile camera module 10 in which the connecting section 40 is easily deformed (for example, bent) in accordance with a setting condition while ensuring high rigidity of the imaging function section 20 and the connector forming section 30.

The camera module 10 preferably further includes a light shielding member 70. The light shielding member 70 is preferably made of a material having insulating and light shielding properties. More specifically, the light shielding member 70 is preferably made of a material having a property of transmitting no light or greatly attenuating light in a wavelength range to which the image sensor IC 60 reacts. Further, the light shielding member 70 preferably has a certain degree of elasticity. For example, the light shielding member 70 is realized by black-colored epoxy resin. Such black epoxy resin can be obtained, for example, by kneading epoxy resin with a black filler.

As illustrated in FIGS. 1 and 2, the light shielding member 70 is disposed to cover at least a boundary between the imaging function section 20 and the connecting section 40 on the other principal surface side of the laminated body 100. In other words, the light shielding member 70 is disposed to cover a boundary line, where the imaging function section 20 and the connecting section 40 are in contact with each other, in the height difference defined by the imaging function section 20 and the connecting section 40.

At such a boundary between the imaging function section 20 having high rigidity and the deformable connecting section 40 having low rigidity is apt to be cracked or broken by bending strength applied when the connecting section 40 is bent. If such a crack or a break occurs, outside light may leak into the cavity 211 through a gap formed by the crack or break.

The imaging function section 20 and the connecting section 40 are formed preferably by pressing a plurality of flexible sheets with heat and pressure. However, since the imaging function section 20 and the connecting section 40 are different in thickness, a state of connection by bonding with heat and pressure may become weaker near the boundary than in other portions. If such a weak connection state occurs, it may cause leakage of outside light into the cavity 211, similarly to the above-described gap formed by a crack or break.

However, the strength of the boundary against the bending stress is increased by disposing the light shielding member 70 to cover the boundary, as in the camera module 10 of the present preferred embodiment. This prevents a crack or a break at the boundary and prevents leakage of outside light into the cavity 211. Further, even if a weak connection state occurs, the light shielding member 70 prevents outside light from leaking into the cavity 211.

By using the structure of this preferred embodiment, as described above, unnecessary light is reliably prevented from entering not only the open surface of the cavity 211, but also the cavity 211 owing to structural degradation at the boundary position between the imaging function section 20 and the connecting section 40.

Figure 4:
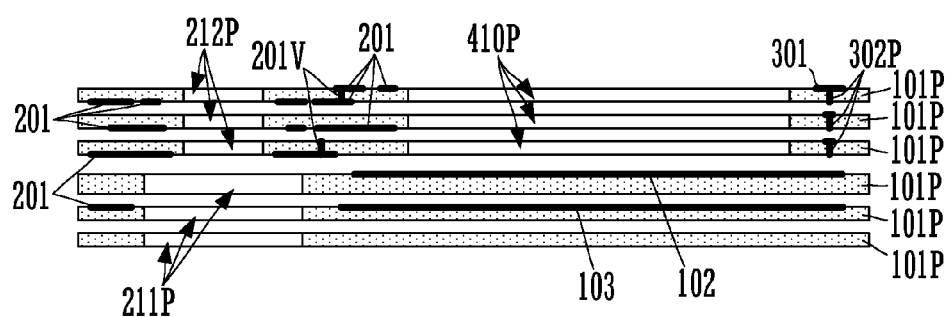
FIG. 4 explains a camera module manufacturing process, and illustrates steps of forming a laminated body.
Figure 5A:
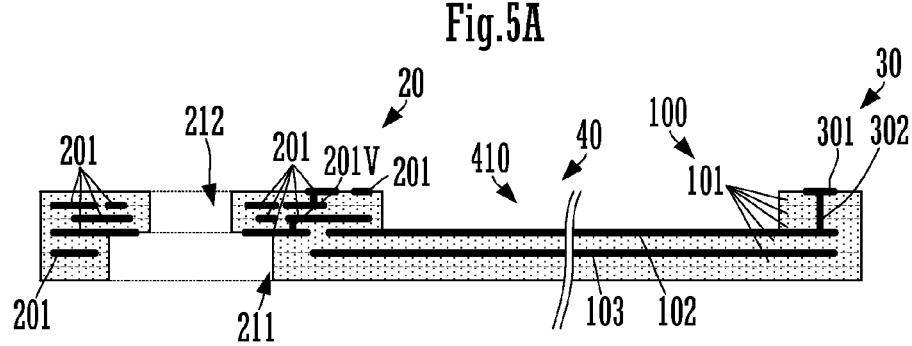
FIGS. 5A, 5B, and 5C explain the camera module manufacturing process.
Figure 5B:
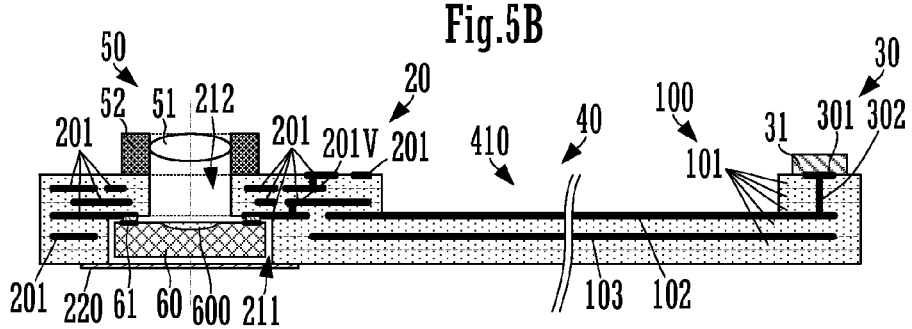
Figure 5C:
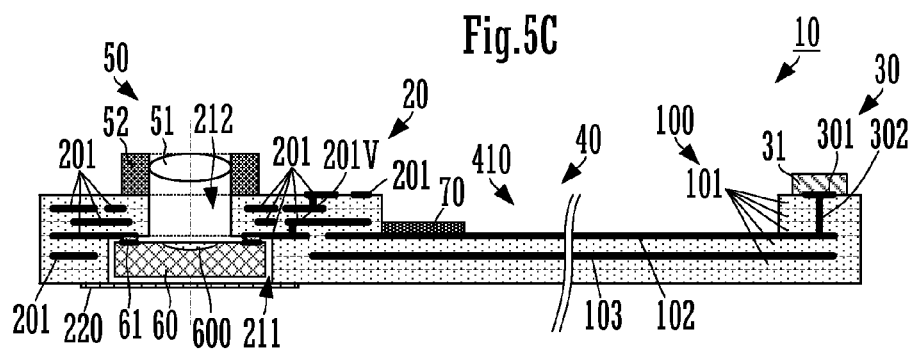

The camera module 10 having this structure preferably is manufactured by the following non-limiting example of a manufacturing process. FIGS. 4, 5A, 5B, and 5C illustrate a manufacturing process for the camera module 10. FIG. 4 illustrates a step of forming a laminated body. FIG. 5A is a side view of the formed laminated body. FIG. 5B illustrates a state in which various components are mounted on the laminated body. FIG. 5C illustrates a completed state of a camera module, and is the same as FIG. 1.

First, as illustrated in FIG. 4, a plurality of thermoplastic flexible sheets 101P formed of, for example, a liquid crystal polymer, are prepared. One side or both sides of each of the flexible sheets 101P is clad with metal. A metal film typically used for such a metal-clad sheet is copper foil. By patterning the flexible sheets 101P using photolithography and etching techniques, conductor patterns 201, signal conductors 102, a ground conductor 103, and so on are formed on predetermined flexible sheets. Also, holes for via conductors filled with conductive paste, which are to become conductive patterns 201V, a connection via conductor 302, and so on, are formed in predetermined flexible sheets 101P. The conductive paste is formed of a conductive material mainly composed of tin or silver.

Next, apertures 211P, 212P, and 411P, which can be to become a cavity 211, a through hole 212, and a recess 410, are formed in the patterned flexible sheets 101P by punching.

The flexible sheets 101P that have thus been subjected to patterning and formation of apertures are stacked. At this time, when peripheral circuit components are to be incorporated, they are placed between the flexible sheets 101P in accordance with arrangement positions.

In this state, the plural stacked flexible sheets 101P are bonded with heat and pressure. At this time, since thermoplastic resin is used, a laminated body 100 is formed by combining the flexible sheets 101P without using bonding layers such as bonding sheets or prepreg. At the time of bonding with heat and pressure, the conductive paste filled in the holes for via conductors solidifies to form a via conductor (interlayer connection conductor) 201V and a connection via conductor 302. Thus, a laminated body 100 illustrated in FIG. 5A is completed.

The above steps are performed in a multi-sheet state in which a plurality of laminated bodies 100 are arranged in a plurality of rows.

Next, mount components, that is, a lens unit 50 and an image sensor IC 60 are mounted on each of the laminated bodies 100 in the multi-sheet state. The lens unit 50 and the image sensor IC 60 are mounted by being connected by solder or metal bumps.

Further, a cover member 220 is disposed to cover an open surface of the cavity 211, and the cover member 220 is fixed to one principal surface side of each laminated body 100. The cover member 220 may be fixed to the laminated body 100 with a bonding material or an adhesive material. Thus, the laminated body 100 on which the mount components are mounted is completed, as illustrated in FIG. 5B.

Next, a light shielding member 70 is disposed to cover a boundary between an imaging function section 20 and a connecting section 40 in the laminated body 100. Specifically, black epoxy resin in a liquid state is applied to the boundary position. Then, the black epoxy resin is cured by heat-treating the laminated body 100 on which the black epoxy resin is applied. Thus, the light shielding member 70 is fixed to cover the boundary position.

The light shielding member 70 may be formed by applying resin in a liquid state. Alternatively, for example, the light shielding member 70 may be configured in the form of a tape and the tape-configured light shielding member 70 may be stuck to cover the boundary. Further alternatively, a light shielding member may be sprayed onto a region including the boundary. However, since the resin in a liquid state is used, it enters between the layers of the imaging function section 20 from the boundary. Hence, even when bonding with heat and pressure is weak and the interlayer connection is rough, as described above, a dense structure is realized by the resin. Therefore, the strength at the boundary is increased, and incidence of outside light is prevented more reliably. Thus, camera modules 10 are completed in a state of a multi-sheet, as illustrated in FIG. 5C.

By cutting the multi-sheet into individual laminated bodies 100, each camera module 10 is provided.

Figure 6:
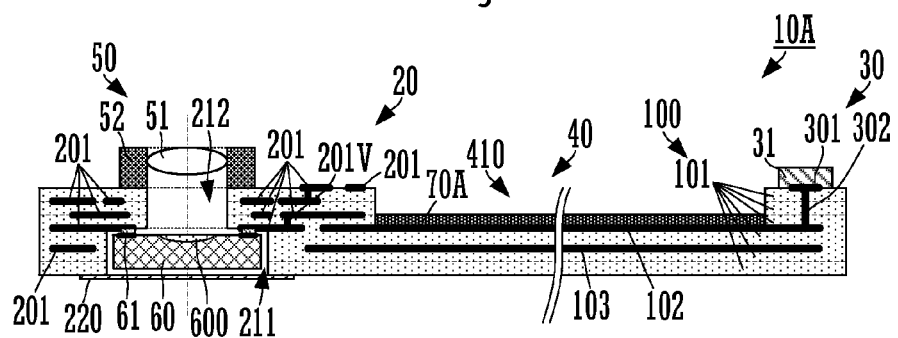
FIG. 6 is a sectional side view of a camera module according to a second preferred embodiment of the present invention.

Next, a camera module according to a second preferred embodiment of the present invention will be described with reference to FIG. 6, which is a sectional side view of the camera module according to the second preferred embodiment of the present invention.

A camera module 10A of this preferred embodiment is different in the shape of a light shielding member 70A from the camera module 10 of the first preferred embodiment, and other structures are preferably the same as those adopted in the camera module 10 of the first preferred embodiment. Therefore, only differences from the camera module 10 of the first preferred embodiment will be described below.

The light shielding member 70A is disposed over the entire other principal surface of a connecting section 40, that is, over the entire surface that defines a height difference with an imaging function section 20.

According to this structure, signal conductors 102 preferably are covered with the light shielding member 70A. That is, the light shielding member 70A also defines and functions as an insulating resist film. This protects the signal conductors 102 from an external environment.

Thus, in the camera module 10A of this preferred embodiment, the above-described incidence of unnecessary light is reliably prevented, and higher reliability is realized.

Figure 7:
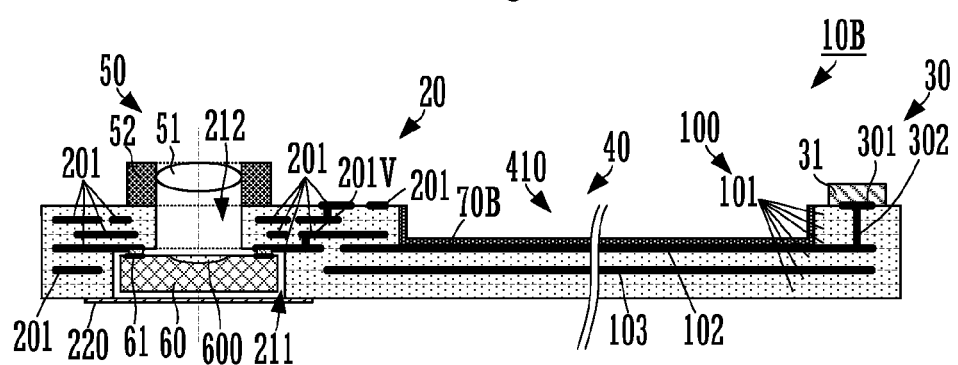
FIG. 7 is a sectional side view of a camera module according to a third preferred embodiment of the present invention.

Next, a camera module according to a third preferred embodiment of the present invention will be described with reference to FIG. 7, which is a sectional side view of the camera module according to the third preferred embodiment of the present invention.

A camera module 10B of this preferred embodiment is different in the shape of a light shielding member 70B from the camera module 10A of the second preferred embodiment, and other structures are preferably the same as those adopted in the camera module 10A of the second preferred embodiment. Therefore, only differences from the camera module 10A of the second preferred embodiment will be described below.

A light shielding member 70B preferably is disposed over the entire other principal surface of a connecting section 40, that is, over the entire surface that defines a height difference with an imaging function section 20. Further, the light shielding member 70B is also provided on a side surface of the imaging function section 20 on a side of the connecting section 40 and a side surface of a connector forming section 30 on a side of the connecting section 40. The light shielding member 70B does not always need to be provided on the side surface of the connector forming section 30 on the side of the connecting section 40.

According to this structure, the side surface of the imaging function section 20 on the side of the connecting section is covered with the light shielding member 70B. Hence, incidence of unnecessary light from the side surface is reliably prevented. This more reliably prevents incidence of unnecessary light.

Figure 8:
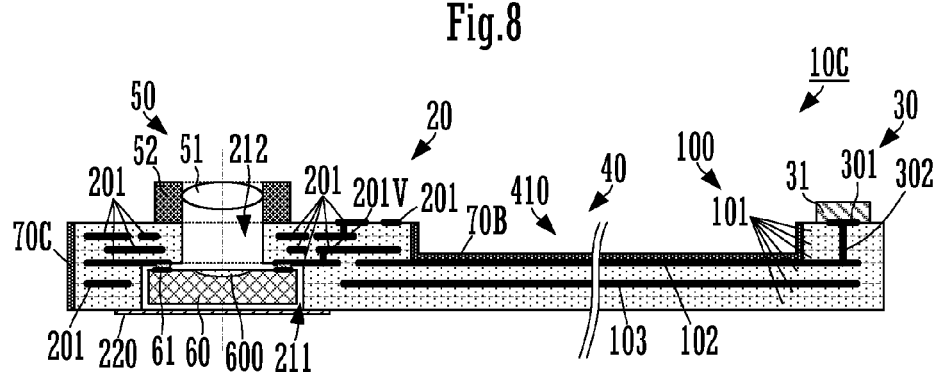
FIG. 8 is a sectional side view of a camera module according to a fourth preferred embodiment of the present invention.

Next, a camera module according to a fourth preferred embodiment of the present invention will be described with reference to FIG. 8, which is a sectional side view of the camera module according to the fourth preferred embodiment of the present invention.

A light shielding member 70C is added in a camera module 10C of this preferred embodiment, in contrast to the camera module 10B of the third preferred embodiment. Other structures are preferably the same as those adopted in the camera module 10B of the third preferred embodiment. Therefore, only differences from the camera module 10B of the third preferred embodiment will be described below.

The light shielding member 70C is provided on all side surfaces of an imaging function section 20 (except for a side surface on a side of a connecting section 40). According to this structure, all the side surfaces of the imaging function section 20 are covered with the light shielding members 70B and 70C. Hence, incidence from unnecessary light from the side surfaces is reliably prevented. This more reliably prevents incidence of unnecessary light.

While the light shielding members preferably are disposed on all the side surfaces of the imaging function section in the above description, for example, the light shielding member 70C may be disposed on the side surface of the imaging function section 20 opposite from the connecting section 40.

Figure 9:
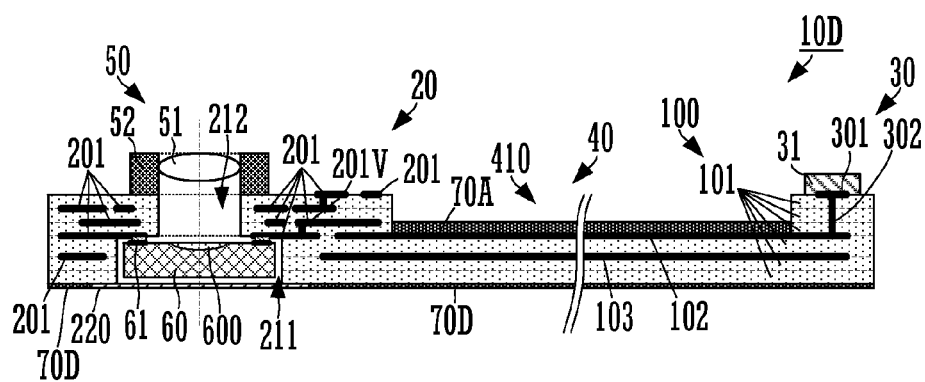
FIG. 9 is a sectional side view of a camera module according to a fifth preferred embodiment of the present invention.

Next, a camera module according to a fifth preferred embodiment of the present invention will be described with reference to FIG. 9, which is a sectional side view of the camera module according to the fifth preferred embodiment of the present invention.

A light shielding member 70D is added in a camera module 10D of this preferred embodiment, in contrast to the camera module of the first preferred embodiment. Other structures are preferably the same as those adopted in the camera module 10 of the first preferred embodiment. Therefore, only differences from the camera module 10 of the first preferred embodiment will be described below.

The light shielding member 70D is disposed on one principal surface of a laminated body 100. At this time, the light shielding member 70D is disposed to cover at least an outer periphery of a cover member 220. That is, the light shielding member 70D is disposed to cover a boundary line where the cover member 220 is in contact with the one principal surface of the laminated body 100.

According to this structure, even when a gap is formed between contact surfaces of the cover member 220 and the laminated body 100, the light shielding member 70D reliably prevents incidence of outside light. Thus, incidence of unnecessary light is more reliably prevented on an aperture side of a cavity.

Figure 10:
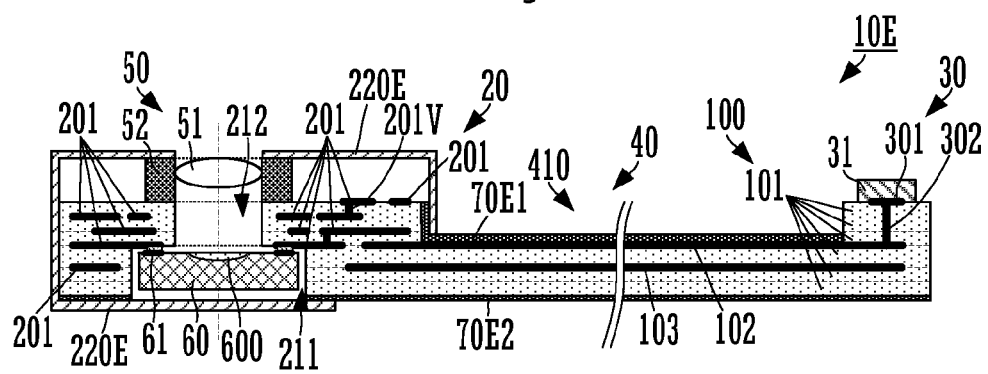
FIG. 10 is a sectional side view of a camera module according to a sixth preferred embodiment of the present invention.

Next, a camera module according to a sixth preferred embodiment of the present invention will be described with reference to FIG. 10, which is a sectional side view of the camera module according to the sixth preferred embodiment of the present invention.

A camera module 10E of this preferred embodiment is different from the camera module 10D of the fifth preferred embodiment in the shape of a cover member 220E and light shielding members 70E1 and 70E2. Other structures are preferably the same as those adopted in the camera module 10D of the fifth preferred embodiment. Therefore, only differences from the camera module 10D of the fifth preferred embodiment will be described below.

The light shielding member 70E1 is configured to extend from the other principal surface of a connecting section 40 to a side surface of an imaging function section 20.

The light shielding member 70E2 is provided on one principal surface of a laminated body 100. The light shielding member 70E2 is provided to include at least a region where the cover member 220E is in contact with the one principal surface of the laminated body 100.

The cover member 220E is configured to cover one principal surface, the other principal surface, and side surfaces of the imaging function section 20. The cover member 220E has an aperture corresponding to a light collecting portion of a lens unit 50. The cover member 220E is in contact with the one principal surface and the side surfaces. On the other principal surface, the cover member 220E is in contact with an end surface of the lens unit 50 opposite from an end surface mounted on the laminated body 100.

By using the cover member 220E having such a structure, outside light is prevented from entering from portions other than the light collecting portion of the lens unit 50. Further, the cover member 220E is in contact with the laminated body 100 via the light shielding members 70E1 and 70E2 at the one principal surface and the side surface of the imaging function section 20 on the side of the connecting section 40. Here, when the light shielding members 70E1 and 70E2 are formed of a material having predetermined elasticity, for example, epoxy resin, the cover member 220E and the laminated body 100 are in tight contact with the light shielding members 70E1 and 70E2 being disposed therebetween. Therefore, a gap through which light passes is not formed between the cover member 220E and the laminated body 100. This more reliably prevents incidence of outside light.

Since the cover member 220E has an opening on the side of the connecting section 40 while being disposed on the laminated body 100, it can be attached to the laminated body 100 by inserting the imaging function section 20 from the opening such as to clamp the imaging function section 20. For example, the cover member 220E may preferably include a plurality of components, for example, a component in contact with one end surface and the other component. In this case, it is only necessary to bond the components with a light shielding material after the components are placed on the laminated body 100.

Figure 11:
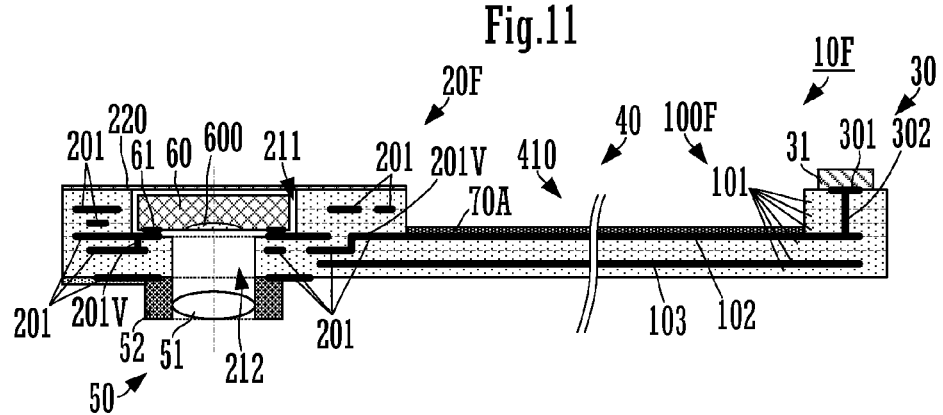
FIG. 11 is a sectional side view of a camera module according to a seventh preferred embodiment of the present invention.

Next, a camera module according to a seventh preferred embodiment of the present invention will be described with reference to FIG. 11, which is a sectional side view of the camera module according to the seventh preferred embodiment of the present invention.

In a basic structure of a camera module 10F of this preferred embodiment, the positions of a lens unit 50 and an image sensor IC 60 in an imaging function section 20F are interchanged in a thickness direction. That is, the image sensor IC 60 and a connector element 31 are disposed on the same principal surface of a laminated body 100F. Other basic structures are preferably the same as those adopted in the camera module 10A of the second preferred embodiment.

Even in such a structure, incidence of unnecessary light is prevented, similarly to the second preferred embodiment of the present invention.

Next, a camera module according to an eighth preferred embodiment of the present invention will be described with reference to FIG. 12, which is a sectional side view of the camera module according to the eighth preferred embodiment of the present invention.

A camera module 10G of this preferred embodiment is different from the camera module 10A of the second preferred embodiment in the structure of an image sensor IC 60 and the structure of a cavity 211G that stores the image sensor IC 60. Other structures are preferably the same as those adopted in the camera module 10A of the second preferred embodiment. Therefore, only differences from the camera module 10A of the second preferred embodiment will be described below.

In the image sensor IC 60, a light receiving element 600 and external connection lands 61 are provided on opposite surfaces. Therefore, the image sensor IC 60 has to be coupled to conductor patterns 201 on a side of the cavity 211G opposite from a side communicating with a through hole 212.

Figure 12:
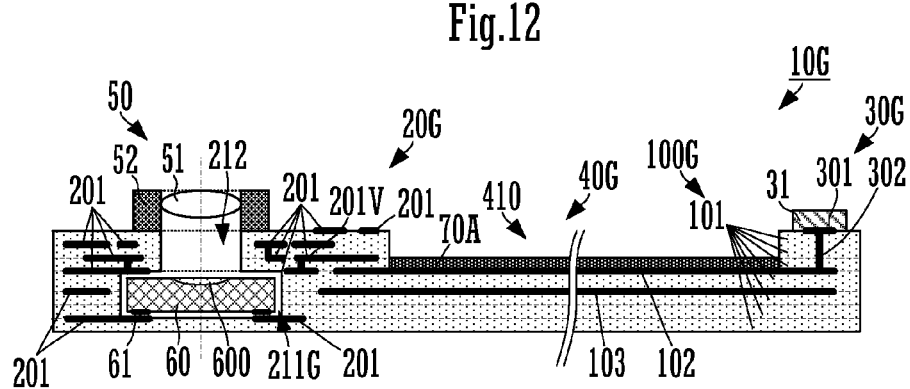
FIG. 12 is a sectional side view of a camera module according to an eighth preferred embodiment of the present invention.

In this case, as illustrated in FIG. 12, the cavity 211G is provided so as not to communicate with the outside except for the through hole 212. Specifically, a laminated body 100G further including a flexible material layer configured to close the aperture of the cavity 211 in the camera module 10A of the second preferred embodiment is preferably used. The added flexible material layer defines a flat surface from an imaging function section 20G to a connector forming section 30G via a connecting section 40G. A conductor pattern 201 is provided on the added flexible material layer, and the external connection lands 61 are mounted on the conductor pattern 201.

According to this structure, the aperture of the cavity is closed without using the cover member 220, and incidence of outside light is prevented. Further, incidence of outside light from a boundary between the imaging function section 20G and the connecting section 40G are also prevented by using a light shielding member 70A.

Figure 13:
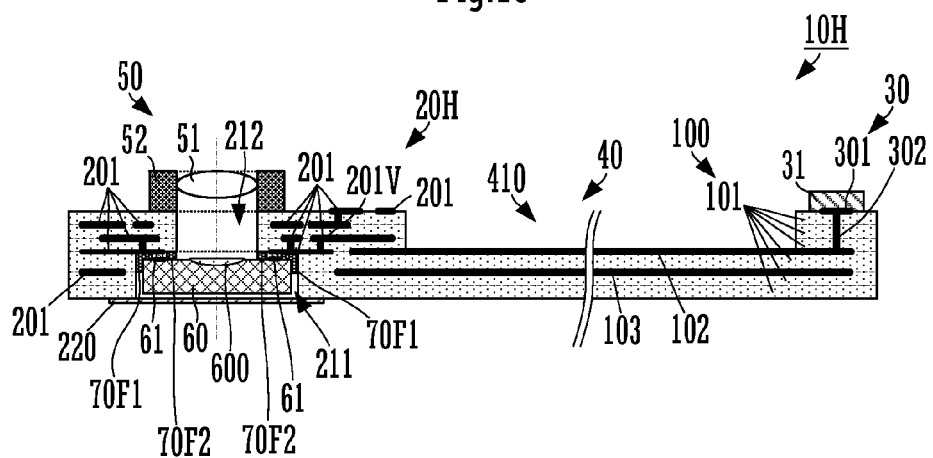
FIG. 13 is a sectional side view of a camera module according to a ninth preferred embodiment of the present invention.

Next, a camera module according to a ninth preferred embodiment of the present invention will be described with reference to FIG. 13, which is a sectional side view of the camera module according to the ninth preferred embodiment of the present invention.

A camera module 10H of this preferred embodiment is different from the camera module 10 of the first preferred embodiment in the arrangement and shape of light shielding members. Therefore, only differences from the camera module 10 of the first preferred embodiment will be described below.

The camera module 10H includes light shielding members 70F1 and 70F2 in an imaging function section 20H. The light shielding member 70F1 is disposed to close edges defined by a bottom face and side surfaces of a cavity 211. The light shielding member 70F1 is disposed closer to the side surfaces of the cavity 211 than a connecting portion between conductor patterns 201 and external connection lands 61. By disposing the light shielding member 70F1 in this way, a boundary in a laminated body 100 (the edges defined by the bottom surface and the side surfaces of the cavity 211) is prevented from being cracked and broken. Even if a weak connection state occurs at a height difference between the imaging function section 20H and a connecting section 40, the light shielding member 70F1 prevents outside light from the height difference from leaking into the cavity 211. Particularly when the light shielding member 70F1 is disposed at almost the same position as the height difference in the thickness direction, it more reliably prevents entry of outside light from the height difference.

Instead of closing all edges defined by the bottom surface and the side surfaces of the cavity 211, the light shielding member 70F1 may cover only the edge on a side of the connecting section 40.

The light shielding member 70F2 is disposed on the bottom surface of the cavity 211 and on an inner side of the connecting portions between the conductor patterns 201 and the external connection lands 61. The thickness of the light shielding member 70F2 is adjusted such that the light shielding member 70F2 closes a gap between the bottom surface of the cavity 211 and a light receiving surface of an image sensor IC 60. By disposing the light shielding member 70F2 in this way, light passing through a lens 51 and a through hole 212 is prevented from being reflected at the gap. This prevents incidence of unnecessary light on a light receiving element 600.

Figure 14:
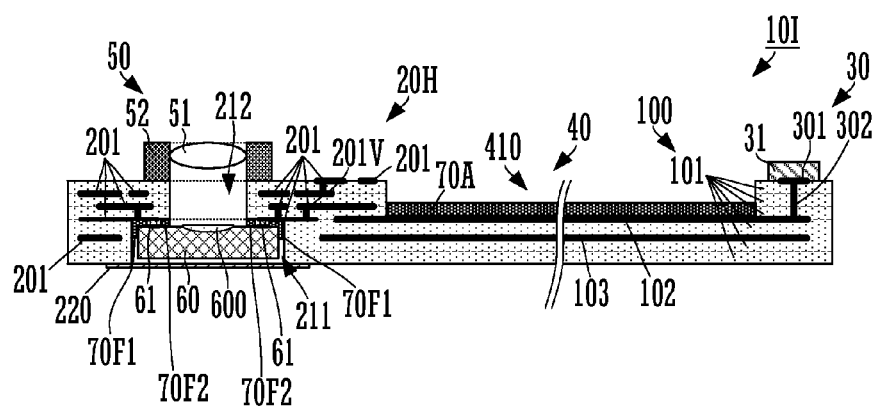
FIG. 14 is a sectional side view of a camera module according to a tenth preferred embodiment of the present invention.

A camera module according to a tenth preferred embodiment of the present invention will be described with reference to FIG. 14, which is a sectional side view of the camera module according to the tenth preferred embodiment of the present invention.

A camera module 10I of this preferred embodiment further includes a light shielding member 70A, in contrast to the camera module 10H of the ninth preferred embodiment.

The light shielding member 70A is disposed on the other principal surface side of a connecting section 40, similarly to the camera module 10A of the second preferred embodiment. In this structure, the light shielding member 70A prevents a crack and a break at a height difference between an imaging function section 20H and the connecting section 40. Hence, incidence of unnecessary light on a cavity 211 is prevented further.

The above-described preferred embodiments may preferably be utilized by combining the characteristic structures thereof.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A camera module comprising:
    a laminated body including a plurality of stacked flexible material layers;
    an image sensor IC including a light receiving element; and
    a lens unit configured to collect light on the light receiving element; wherein
    the laminated body is structured such that an imaging function section is combined with a connecting section coupled to the imaging function section and having a thickness less than a thickness of the imaging function section;
    the imaging function section includes a cavity configured to receive the image sensor IC in the imaging function section and provided on one principal surface of the laminated body, and a through hole configured to allow the cavity to communicate with outside;
    the image sensor IC is disposed within the cavity such that the light receiving element faces toward the other principal surface of the laminated body;
    the lens unit is disposed on the other principal surface of the laminated body to be optically coupled to the light receiving element via the through hole;

a light shielding member is provided to include a boundary between surfaces of the imaging function section and the connecting section that define a height difference;

the light shielding member includes a black filler and resin; and the light shielding member covers an entire surface of the connecting section that defines the height difference with the imaging function section.

2. The camera module according to claim 1, wherein the light shielding member covers a side surface of the imaging function section on a side of the connecting section.

3. The camera module according to claim 1, wherein
the height difference is provided on the other principal surface of the imaging function section; and
in a thickness direction of the laminated body, a surface of the cavity on a side of the through hole is provided at a same position as the surface of the connecting section having the height difference, or in an area where the imaging function section is not in contact with the connecting section.

4. The camera module according to claim 1, wherein
the cavity is configured to open to the outside on a side opposite to the through hole;
a cover member is provided to cover the cavity; and
the light shielding member is configured to cover a boundary where an end surface of the cover member is in contact with the laminated body.

5. The camera module according to claim 4, wherein
the cover member is configured to cover the imaging function section; and
the light shielding member is configured to reach an interface between the imaging function section and the cover member.

6. The camera module according to claim 1, further comprising a connector forming section provided in the laminated body.

7. The camera module according to claim 6, wherein the connecting section is coupled to physically and electrically couple the imaging function section and the connector forming section.

8. The camera module according to claim 6, wherein a thickness of the imaging function section and a thickness of the connector forming section are greater than a thickness of the connecting section.

9. The camera module according to claim 1, further comprising a peripheral circuit unit including conductor patterns and a connector element.

10. The camera module according to claim 9, wherein the lens unit, the image sensor IC and the peripheral circuit unit are provided in the imaging function section and are coupled to each other.

11. The camera module according to claim 9, wherein the image sensor IC and the connector element are disposed on a same principal surface of the laminated body.

12. The camera module according to claim 1, wherein a depth of the cavity is greater than a height of the image sensor IC and an area of the cavity is greater than a planar area of the image sensor IC.

13. The camera module according to claim 1, wherein the cavity is located at a center or approximate center of the imaging function section in plan view.

14. The camera module according to claim 1, wherein the through hole is configured to penetrate between a bottom surface of the cavity and the other principal surface of the laminated body, and such that a center of the through hole is aligned or substantially aligned with a center of the cavity in plan view.

15. The camera module according to claim 1, wherein the light shielding member is configured to cover all side surfaces of the imaging function section except for a side surface on a side of the connecting section.

16. The camera module according to claim 1, further comprising a cover member provided to cover the cavity, the one principal surface, the other principal surface and the imaging function section.

17. The camera module according to claim 16, wherein the cover member includes an aperture corresponding to a position of a light collecting portion of the lens unit.

18. The camera module according to claim 16, wherein the cover member is in contact with an end surface of the lens unit opposite to an end surface of lens unit mounted on the laminated body.

19. The camera module according to claim 1, wherein the image sensor IC includes a light receiving element and external connection lands provided on opposite surfaces.

20. A camera module comprising:
a laminated body including a plurality of stacked flexible material layers;
an image sensor IC including a light receiving element; and
a lens unit configured to collect light on the light receiving element; wherein
the laminated body is structured such that an imaging function section is combined with a connecting section coupled to the imaging function section and having a thickness less than a thickness of the imaging function section;
the imaging function section includes a cavity configured to receive the image sensor IC in the imaging function section and provided on one principal surface of the laminated body, and a through hole configured to allow the cavity to communicate with outside;
the image sensor IC is disposed within the cavity such that the light receiving element faces toward the other principal surface of the laminated body and mounted on a surface of the cavity on a side of the through hole;
the lens unit is disposed on the other principal surface of the laminated body to be optically coupled to the light receiving element via the through hole; and
a light shielding member is provided to include a boundary between surfaces of the imaging function section and the connecting section that define a height difference.

* * * * *